US012787137B2

(12) United States Patent
Wang

(10) Patent No.: US 12,787,137 B2
(45) Date of Patent: Nov. 3, 2026

(54) FESTIVAL LIGHT DEVICE WITH TEMPERATURE CONTROL PROTECTION

(71) Applicant: Guangzhou Ting Shen Electric Co., Ltd, Guangzhou (CN)

(72) Inventor: Chia-Chun Wang, Guangzhou (CN)

(73) Assignee: Guangzhou Ting Shen Electric Co., Ltd, Guangzhou (CN)

( * ) Notice: Subject to any disclaimer, the term of this patent is extended or adjusted under 35 U.S.C. 154(b) by 69 days.

(21) Appl. No.: 18/613,354

(22) Filed: Mar. 22, 2024

(65) Prior Publication Data

US 2025/0254772 A1 Aug. 7, 2025

(30) Foreign Application Priority Data

Feb. 3, 2024 (CN) ......................... 202420263404.9

(51) Int. Cl.

*H05B 47/14* (2020.01)
*F21V 21/002* (2006.01)
*F21V 23/00* (2015.01)
*F21V 23/06* (2006.01)
*H05B 45/56* (2020.01)
*F21W 131/40* (2006.01)

(52) U.S. Cl.

CPC ........... *H05B 45/56* (2020.01); *F21V 21/002* (2013.01); *F21V 23/004* (2013.01); *F21V 23/06* (2013.01); *H05B 47/14* (2020.01); *F21W 2131/40* (2013.01)

(58) Field of Classification Search

CPC ........ H05B 45/50; H05B 45/56; H05B 47/00; H05B 47/10; H05B 47/14; H05B 47/28; F21V 21/002; F21V 21/35; F21V 23/00; F21V 23/004; F21V 23/007; F21V 23/02; F21V 23/06

See application file for complete search history.

(56) References Cited

U.S. PATENT DOCUMENTS

| | | | | |
|---|---|---|---|---|
| 12,213,223 B1 * | 1/2025 | Xu | ........................ | H05B 45/382 |
| 2017/0303353 A1 * | 10/2017 | Guang | ................. | H05B 45/375 |
| 2017/0331231 A1 * | 11/2017 | Ng | ........................ | H01R 13/665 |
| 2023/0151954 A1 * | 5/2023 | Wang | ........................ | H02M 7/06 315/206 |

FOREIGN PATENT DOCUMENTS

| | | | |
|---|---|---|---|
| CN | 203911036 U | * | 10/2014 |
| CN | 209881669 U | * | 12/2019 |

* cited by examiner

*Primary Examiner* — Thai Pham

(57) ABSTRACT

A festival light device featuring temperature control protection comprises a plug body, a back cover with a connecting hole, and a circuit board. The back cover houses a socket hole within a cavity formed by an inner flange, ensuring component protection and water resistance. The circuit board comprises a rectifier filter device with a fuse, thermal coupler switch, and PTC. Sealant blocks the socket hole of plug-in transformer, preventing water ingress, while barbs on the flange secure the sealant, maintaining waterproof integrity. Added safety measures, such as a fuse, thermal coupler switch, and PTC at the voltage input, protect against overheating and potential component damage, enhancing the device's overall safety and durability.

6 Claims, 7 Drawing Sheets

FESTIVAL LIGHT DEVICE WITH TEMPERATURE CONTROL PROTECTION

CROSS REFERENCE TO RELATED APPLICATIONS

The present application claims the benefit of Chinese Patent Application No. 202420263404.9 filed on Feb. 3, 2024, the contents of which are incorporated herein by reference in their entirety.

TECHNICAL FIELD

This patent application relates to the field of festival light devices, especially to a festival light device with temperature control protection.

BACKGROUND ART

When the plug operates in a humid environment, if rainwater, snow, or fog penetrates inside the plug, it can cause short-circuiting of internal electronic components. Currently, the waterproof measures for plug-in transformers on the market involve setting a waterproof structure between the back cover and the plug body to achieve waterproofing. However, to connect the wires, a hole for the power line to pass through must be created, and there will always be gaps between the wire hole and the wires, making it impossible for the location of the wire hole to be waterproof. At the same time, the transformation circuit board inside the plug lacks protective circuit components. A patent with the publication number CN203911036U provides a waterproof structure for a festival light device with temperature control protection, comprising a plug body and a back cover set on the plug body, with a socket hole on the back cover; around the socket hole inside the back cover, there is a flange connected to the back cover forming a cavity. However, this patent application does not design for the setup of protective circuits.

SUMMARY

The problem this patent application aims to solve is to provide a festival light device with temperature control protection that can be waterproof and has protective devices for the internal circuit of the plug-in transformer.

To solve the above technical problem, the technical solution adopted by this patent application is: a festival light device with temperature control protection, comprising a plug body, a back cover set on the plug body, and a circuit board located inside the plug body; the back cover has a connecting hole, within which a socket hole is provided; on the inner surface of the back cover, there is a flange, which together with the inner surface of the back cover forms a cavity, and the socket hole is located within the cavity formed by the flange; the circuit board comprises a power input, a first rectifier filter device, transformer T1, feedback circuit, power chip, second rectifier filter device, switch component, and power output, the first rectifier filter device comprises a fuse and thermal coupler switch; the power signal passes through the first rectifier filter device, switch component, transformer T1, and second rectifier filter device in sequence, and after passing through transformer T1, the power signal is also transmitted to the switch component through the feedback circuit and power chip.

As an improvement, the first rectifier filter device further comprises a bridge rectifier BD1, resistor R12, inductor L1, capacitor EC2, and inductor L2; the feedback circuit comprises resistor R5, resistor R13, capacitor C1, capacitor EC3, diode D2, resistor R3, and resistor R4; the second rectifier filter device comprises D3, D4, capacitor C3, resistor R10, and capacitor EC4; the switch component is located on the power chip U1; the live wire of the power input is connected sequentially through the fuse F1, PTC, and the second pin of the bridge rectifier BD1; the fourth pin of the bridge rectifier BD1 is connected to the neutral line of the power input; the first pin of the bridge rectifier BD1 is connected to the input end of the parallel circuit formed by resistor R12 and inductor L1, the output end of the parallel circuit formed by R12 and L1 is connected to the primary coil of transformer T1, and sequentially through R1 and R2 to the fourth pin of the power chip, the output end of the parallel circuit formed by R12 and L1 is connected to the positive pole of capacitor EC2, the negative pole of capacitor EC2 is connected to the output end of inductor L2; the third pin of the bridge rectifier BD1 is connected to the input end of inductor L2, the output end of inductor L2 through a circuit formed in parallel by R6 and R7 is connected to the first pin of the power chip; the output end of inductor L2 through a circuit formed in parallel by R5, R13, and capacitor C1 is connected to the second pin of the power chip; the inductor L2 is connected to the negative pole of capacitor EC3; the seventh and eighth pins of the power chip U1, after being paralleled, are passed through diode D1, resistor R8, the output end of resistor R8 through a circuit formed in parallel by resistor R9 and capacitor C2 is connected to the primary coil of transformer T1; the seventh and eighth pins of the power chip, after being paralleled, are connected to the secondary coil of transformer T1; the sixth terminal of the secondary coil of transformer T1 through a circuit formed in parallel by diode D4, diode D3, and capacitor C3 is connected to the positive pole of the power output, capacitor C3, and resistor R10 are connected in series, the tenth terminal of transformer T1 is connected to the negative pole of the power output; the tenth terminal of transformer T1 is connected to capacitor CY1, the output end of capacitor CY1 is grounded, the output end of capacitor CY1 is connected to the output end of inductor L2, the output end of capacitor CY1 is connected to the fourth terminal of transformer T1, the fifth terminal of transformer T1 is sequentially connected through resistor R3, diode D2 to the positive pole of capacitor EC3, the fifth terminal of transformer T1 is connected through resistor R4 to the positive pole of capacitor EC3, the positive pole of capacitor EC3 is connected to the fourth pin of the power chip.

As an improvement, the outer side wall of the flange is equipped with three stiffeners connected to the inner side wall of the back cover, the three stiffeners are respectively set on both sides and the top of the flange; barbs are set on the inner side wall of the flange; the inner wall surface of the connecting hole is equipped with chamfers, the outer surface of the connecting hole is equipped with threads for connecting the light string.

To solve the above technical problem, the technical solution adopted by this patent application is: a festival light device with temperature control protection, comprising a plug body, a back cover set on the plug body, and a circuit board located inside the plug body; the back cover has a connecting hole, within which a socket hole is provided; on the inner surface of the back cover, there is a flange, which together with the inner surface of the back cover forms a cavity, and the socket hole is located within the cavity formed by the flange; the circuit board comprises a power input, a first rectifier filter device, transformer T1, feedback circuit, power chip, second rectifier filter device, switch component, and power output, the first rectifier filter device comprises a fuse and thermal coupler switch; the power signal passes through the first rectifier filter device, switch component, transformer T1, and second rectifier filter device in sequence, and after passing through transformer T1, the power signal is also transmitted to the switch component through the feedback circuit and power chip.

As an improvement, the first rectifier filter device additionally comprises a bridge stack BD1, resistor R12, inductor L1, capacitor EC2, and inductor L2. The feedback circuit comprises resistor R5, resistor R13, capacitor C1, capacitor EC3, diode D2, resistor R3, and resistor R4. The second rectifier filter device consists of D3, D4, capacitor C3, resistor R10, and capacitor EC4. The switch component is placed on the power chip U1. The live wire of the power input connects sequentially through fuse F1, a thermal couple switch to the second pin of bridge stack BD1; the fourth pin of BD1 connects to the neutral line of the power input; the first pin of BD1 connects to the input of a parallel circuit formed by resistor R12 and inductor L1, the output of this parallel circuit connects to the primary coil of transformer T1 at one end, sequentially through R1 and R2 to the fourth pin of the power chip, and connects the output of the parallel circuit to the positive pole of capacitor EC2, whose negative pole connects to the output end of inductor L2. The third pin of BD1 connects to the input end of inductor L2, whose output end through a circuit formed in parallel by R6 and R7 connects to the first pin of the power chip; the output end of L2 through a circuit formed in parallel by R5, R13, and capacitor C1 connects to the second pin of the power chip; L2 connects to the negative pole of capacitor EC3. The seventh and eighth pins of power chip U1, after being paralleled, pass through diode D1, resistor R8, whose output end through a parallel circuit formed by resistor R9 and capacitor C2 connects to one end of the primary coil of transformer T1; the seventh and eighth pins of the power chip, after being paralleled, connect to the second end of the primary coil of T1. The sixth terminal of the secondary coil of T1 through a parallel circuit formed by diode D4, diode D3, and capacitor C3 connects to the positive pole of the power output, capacitor C3 and R10 are connected in series, the tenth terminal of T1 connects to the negative pole of the power output; the tenth terminal of T1 connects to capacitor CY1, whose output end grounds, connects to the output end of inductor L2, and to the fourth terminal of T1. The fifth terminal of T1 sequentially through resistor R3, diode D2 connects to the positive pole of capacitor EC3, and through resistor R4 connects to the positive pole of EC3, whose positive pole connects to the fourth pin of the power chip.

As an improvement, the outer side wall of the flange is equipped with three stiffeners connected to the inner side wall of the back cover, the three stiffeners are respectively set on both sides and the top of the flange; barbs are set on the inner side wall of the flange; the inner wall surface of the connecting hole is equipped with chamfers, the outer surface of the connecting hole is equipped with threads for connecting the light string.

To solve the above technical problem, the technical solution adopted by this patent application is: a festival light device with temperature control protection, comprising a plug body, a back cover set on the plug body, and a circuit board located inside the plug body; the back cover has a connecting hole, within which a socket hole is provided; on the inner surface of the back cover, there is a flange, which together with the inner surface of the back cover forms a cavity, and the socket hole is located within the cavity formed by the flange; the circuit board comprises a power input, a first rectifier filter device, transformer T1, feedback circuit, power chip, second rectifier filter device, switch component, and power output, the first rectifier filter device comprises a fuse and thermal coupler switch; the power signal passes through the first rectifier filter device, switch component, transformer T1, and second rectifier filter device in sequence, and after passing through transformer T1, the power signal is also transmitted to the switch component through the feedback circuit and power chip.

As an improvement, the first rectifier filter device also comprises a bridge rectifier BD1, resistor R12, inductor L1, capacitor EC2, and inductor L2. The feedback circuit comprises resistor R5, resistor R13, capacitor C1, capacitor EC3, diode D2, resistor R3, and resistor R4. The second rectifier filter device comprises D3, D4, capacitor C3, resistor R10, and capacitor EC4. The switching component is located on the power chip U1. The live wire of the power input sequentially connects through fuse F1, PTC, and thermal coupler switch to the second pin of bridge stack BD1; the fourth pin of BD1 connects to the neutral line of the power input; the first pin of BD1 connects to the input end of a parallel circuit formed by resistor R12 and inductor L1, the output of this parallel circuit connects to the primary coil of transformer T1 at one end, and through R1 and R2 to the fourth pin of the power chip, the output end of the parallel circuit connects to the positive terminal of capacitor EC2, whose negative terminal connects to the output end of inductor L2. The third pin of BD1 connects to the input end of inductor L2, whose output end through a circuit formed in parallel by R6 and R7 connects to the first pin of the power chip; the output end of inductor L2 through a circuit formed in parallel by R5, R13, and capacitor C1 connects to the second pin of the power chip; inductor L2 connects to the negative terminal of capacitor EC3. The seventh and eighth pins of power chip U1, after being paralleled, sequentially pass through diode D1, resistor R8, the output end of resistor R8 through a parallel circuit formed by resistor R9 and capacitor C2 connects to one end of the primary coil of transformer T1; the seventh and eighth pins of the power chip, after being paralleled, connect to the second terminal of the primary coil of T1. The sixth terminal of the secondary coil of T1 through a parallel circuit formed by diode D4, diode D3, and capacitor C3 connects to the positive terminal of the power output, capacitor C3 and resistor R10 are connected in series, the tenth terminal of T1 connects to the negative terminal of the power output; the tenth terminal of T1 connects to capacitor CY1, the output terminal of capacitor CY1 grounds, connects to the output end of inductor L2, and to the fourth terminal of T1. The fifth terminal of T1 sequentially through resistor R3, diode D2 connects to the positive terminal of capacitor EC3, and through resistor R4 connects to the positive terminal of EC3, whose positive terminal connects to the fourth pin of the power chip.

As an improvement, the outer side wall of the flange is equipped with three stiffeners connected to the inner side wall of the back cover, the three stiffeners are respectively set on both sides and the top of the flange; barbs are set on the inner side wall of the flange; the inner wall surface of the connecting hole is equipped with chamfers, the outer surface of the connecting hole is equipped with threads for connecting the light string.

The beneficial effects of this patent application are: by blocking the socket hole of the transformer plug with sealant, it ensures that water will not seep into the socket hole; barbs are set on the flange, hooking onto the cured sealant to prevent the sealant from falling off, thus ensuring the stability of the socket hole's waterproofing; by adding fuses, thermal coupler switches, and PTCs, or a combination thereof, at the voltage input end, it prevents components from continuing to operate at high temperatures and burning out, thus protecting the entire circuit.

Diagram labels explanation: 1—plug body; 2—housing part; 3—circuit board; 4—power conductor; 5—back cover; 6—connecting hole; 61—chamfer; 62—socket hole; 7—flange; 71—barb; 8—cavity; 9—stiffener.

DETAILED DESCRIPTION

The following further explains this patent application in conjunction with the drawings.

Example 1

Figure 1:
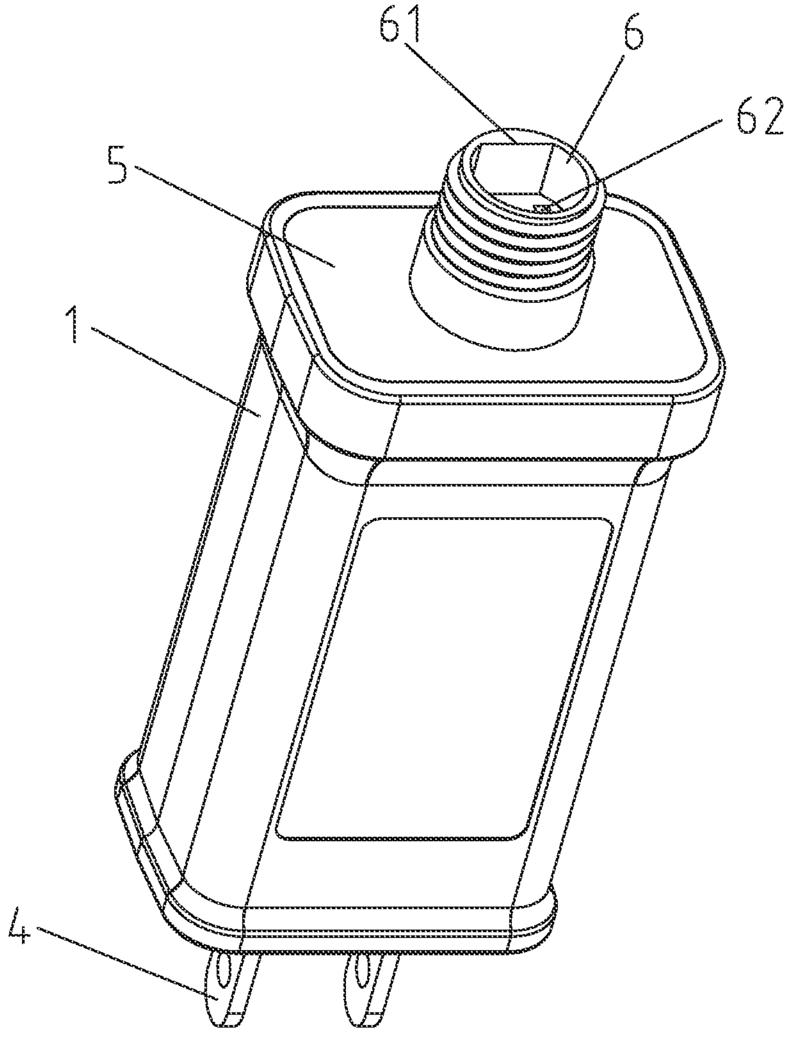
FIG. 1 shows a three-dimensional schematic of the patent application.
Figure 2:
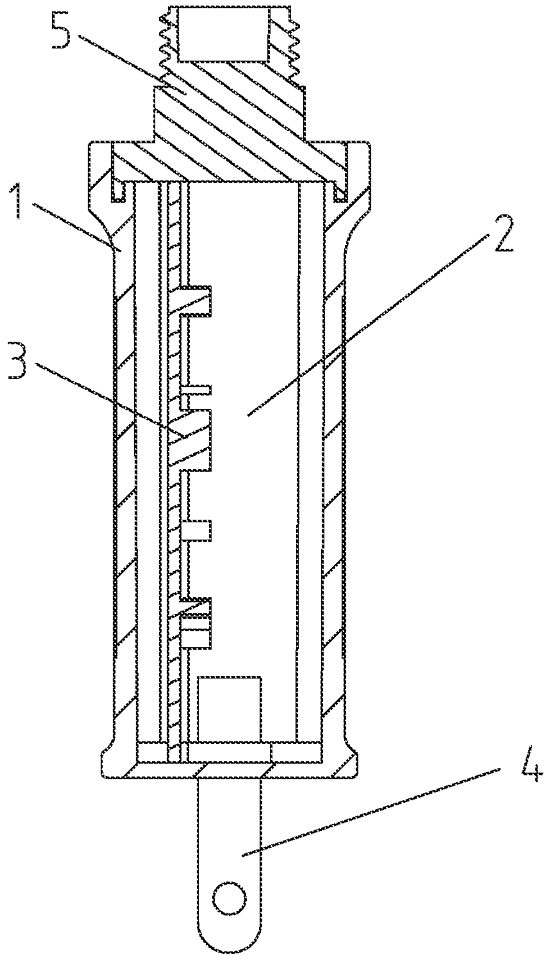
FIG. 2 shows a side cross-sectional view of the patent application.
Figure 3:
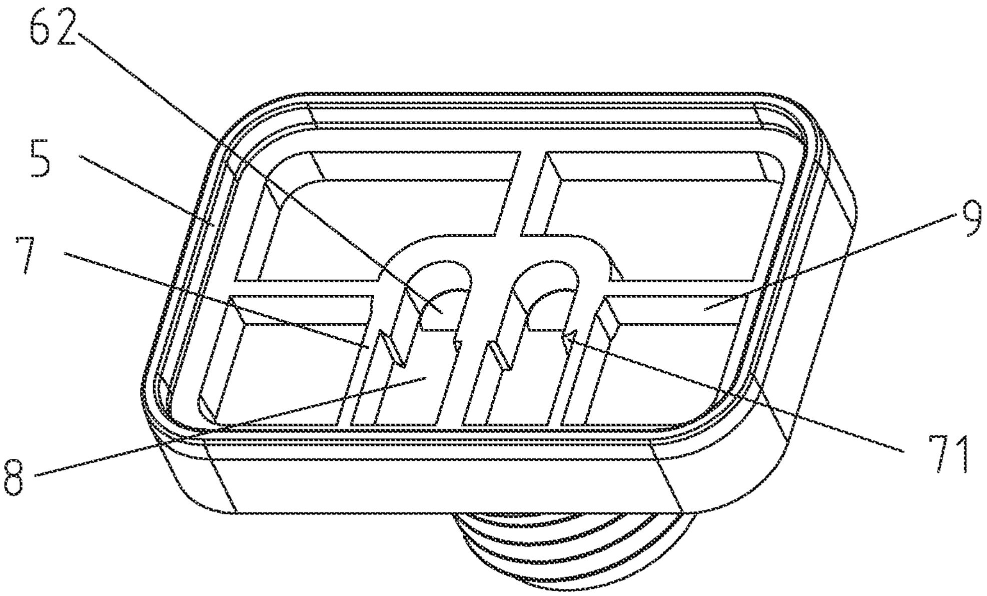
FIG. 3 is a three-dimensional schematic of the back cover.

As shown in FIGS. 1 to 3, the waterproof structure of this patent application's transformer plug comprises a plug body 1 with a hollow housing part 2 inside, which houses a circuit board 3. One end of the plug body 1 is equipped with two power conductors 4 connected to this circuit board 3, while the other end is sealed with a back cover 5 enclosing the housing part 2. The back cover 5 has a socket hole 62, and around this socket hole within the back cover, there's a connected flange 7 forming a cavity 8, with three stiffeners 9 located between the flange 7 and the back cover's inner sidewall, positioned on the sides and top of the flange. The cavity's 8 inner wall features barbs 71. During wire installation, the wire is first threaded through the socket hole 62 on the back cover 5 and electrically connected to the circuit board 3, then the cavity 8 is filled with glue. Once the glue in the cavity 8 solidifies, it effectively seals the socket hole 62, enhancing waterproofing. The stiffeners 9 strengthen the flange's 7 structure, making the waterproof structure of the socket hole 62 more reliable. The barbs 71 hook onto the cured sealant, improving the bond between the sealant and the flange 7, thus enhancing the waterproof structure's reliability. The back cover 5 features a connecting hole 6 with chamfers 61 on its inner wall surface to prevent misalignment when connecting to a light string. The outer surface of the connecting hole 6 has threads for connecting to the light string.

Figure 4:
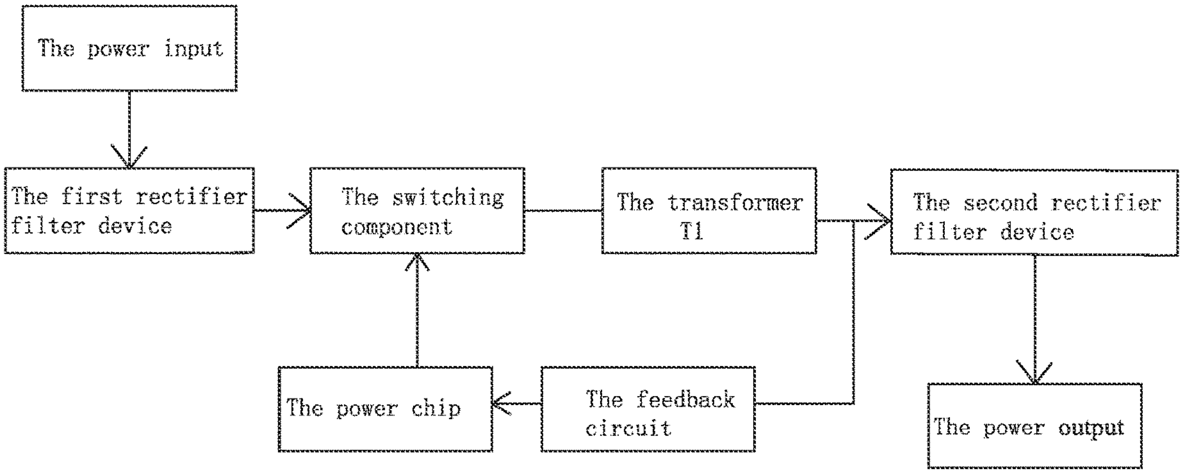
FIG. 4 is a circuit block diagram on the circuit board.
Figure 5:
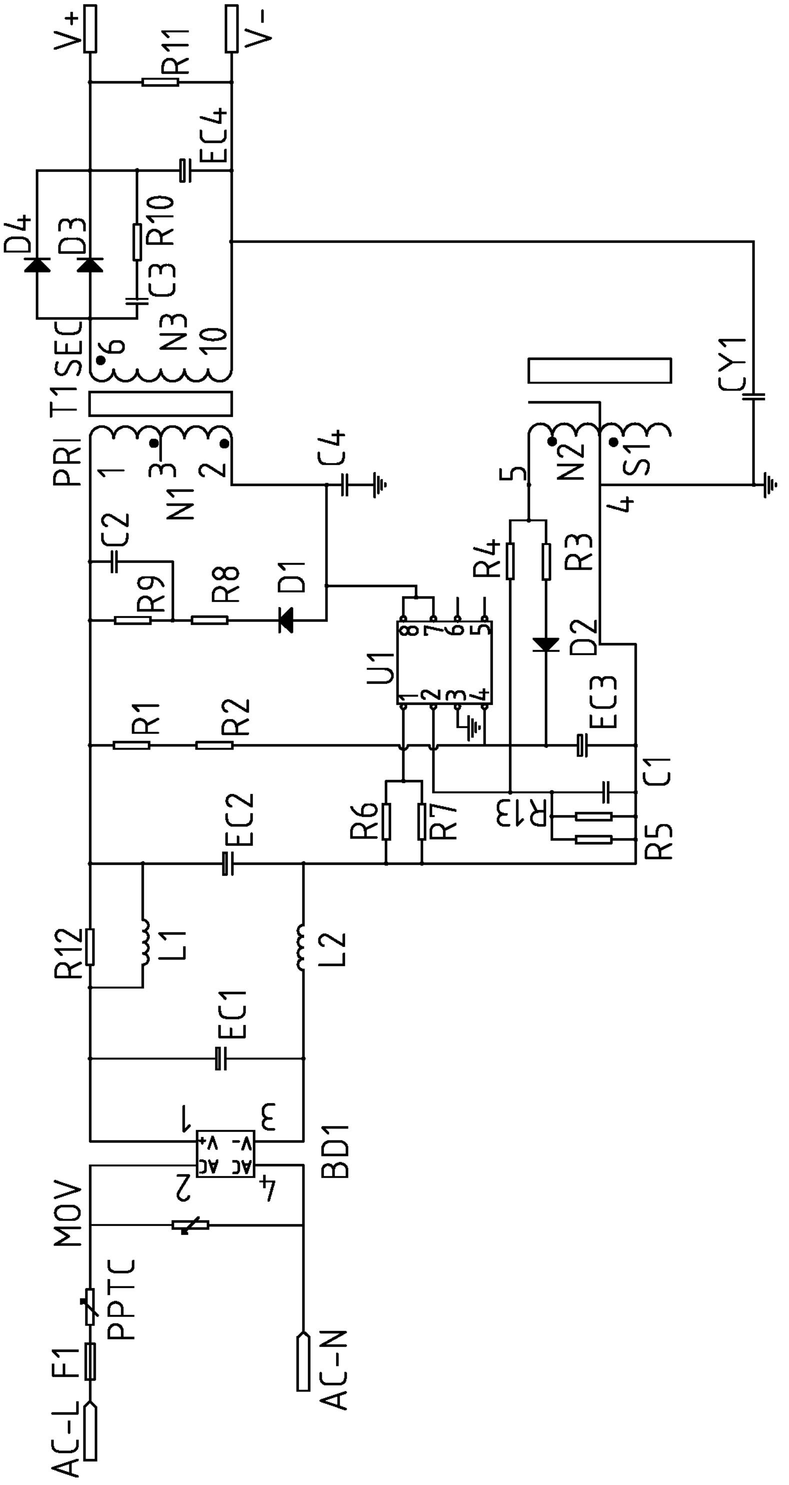
FIG. 5 is a circuit diagram of the first rectifier filter device with a PTC.

As shown in FIGS. 4 and 5, the circuit board comprises a power input, the first rectifier filter device, transformer T1, feedback circuit, power chip, second rectifier filter device, switching component, and power output. The first rectifier filter device comprises a fuse and PTC. When the temperature is too high, the PTC increases resistance with temperature, preventing excessive current from affecting the entire circuit's components, thus preventing damage due to overload caused by high temperatures. The power signal sequentially passes through the first rectifier filter device, switching component, transformer T1, and the second rectifier filter device, with the power signal also transmitted to the switching component through the feedback circuit and power chip after passing through transformer T1.

As shown in FIGS. 4 and 5, the first rectifier filter device also comprises bridge rectifier BD1, resistor R12, inductor L1, capacitor EC2, and inductor L2; the feedback circuit comprises resistor R5, resistor R13, capacitor C1, capacitor EC3, transformer T1, capacitor CY1, diode D2, resistor R3, and resistor R4; the switching component comprises capacitor C4, diode D1, resistor R8, resistor R9, and capacitor C2; the second rectifier filter device comprises D3, D4, capacitor C3, resistor R10, and capacitor EC4. The live wire of the power input sequentially connects through fuse F1, PTC, to the second pin of bridge rectifier BD1; the fourth pin of BD1 connects to the neutral line of the power input; the first pin of BD1 connects to the input end of a parallel circuit formed by resistor R12 and inductor L1, the output of this parallel circuit connects to the primary coil of transformer T1 at one end, and sequentially through R1 and R2 to the fourth pin of the power chip, the output end of the parallel circuit connects to the positive pole of capacitor EC2, whose negative pole connects to the output end of inductor L2. The third pin of BD1 connects to the input end of inductor L2, whose output end through a circuit formed in parallel by R6 and R7 connects to the first pin of the power chip; the output end of inductor L2 through a circuit formed in parallel by R5, R13, and capacitor C1 connects to the second pin of the power chip; inductor L2 connects to the negative pole of capacitor EC3. The seventh and eighth pins of power chip U1, after being paralleled, sequentially pass through diode D1, resistor R8, whose output end through a parallel circuit formed by resistor R9 and capacitor C2 connects to one end of the primary coil of transformer T1; the seventh and eighth pins of the power chip, after being paralleled, connect to the second terminal of the primary coil of T1. The sixth terminal of the secondary coil of T1 through a parallel circuit formed by diode D4, diode D3, and capacitor C3 connects to the positive terminal of the power output, capacitor C3 and resistor R10 are connected in series, the tenth terminal of T1 connects to the negative terminal of the power output; the tenth terminal of T1 connects to capacitor CY1, whose output terminal grounds, connects to the output end of inductor L2, and to the fourth terminal of T1. The fifth terminal of T1 sequentially through resistor R3, diode D2 connects to the positive terminal of capacitor EC3, and through resistor R4 connects to the positive terminal of EC3, whose positive terminal connects to the fourth pin of the power chip.

Example 2

As shown in FIGS. 1 to 3, the waterproof structure of this patent application's transformer plug comprises a plug body 1 with a hollow housing part 2 inside, which houses a circuit board 3. One end of the plug body 1 is equipped with two power conductors 4 connected to this circuit board 3, while the other end is sealed with a back cover 5 enclosing the housing part 2. The back cover 5 has a socket hole 62, and around this socket hole within the back cover, there's a connected flange 7 forming a cavity 8, with three stiffeners 9 located between the flange 7 and the back cover's inner sidewall, positioned on the sides and top of the flange. The cavity's 8 inner wall features barbs 71. During wire installation, the wire is first threaded through the socket hole 62 on the back cover 5 and electrically connected to the circuit board 3, then the cavity 8 is filled with glue. Once the glue in the cavity 8 solidifies, it effectively seals the socket hole 62, enhancing waterproofing. The stiffeners 9 strengthen the flange's 7 structure, making the waterproof structure of the socket hole 62 more reliable. The barbs 71 hook onto the cured sealant, improving the bond between the sealant and the flange 7, thus enhancing the waterproof structure's reliability. The back cover 5 features a connecting hole 6 with chamfers 61 on its inner wall surface to prevent misalignment when connecting to a light string. The outer surface of the connecting hole 6 has threads for connecting to the light string.

Figure 6:
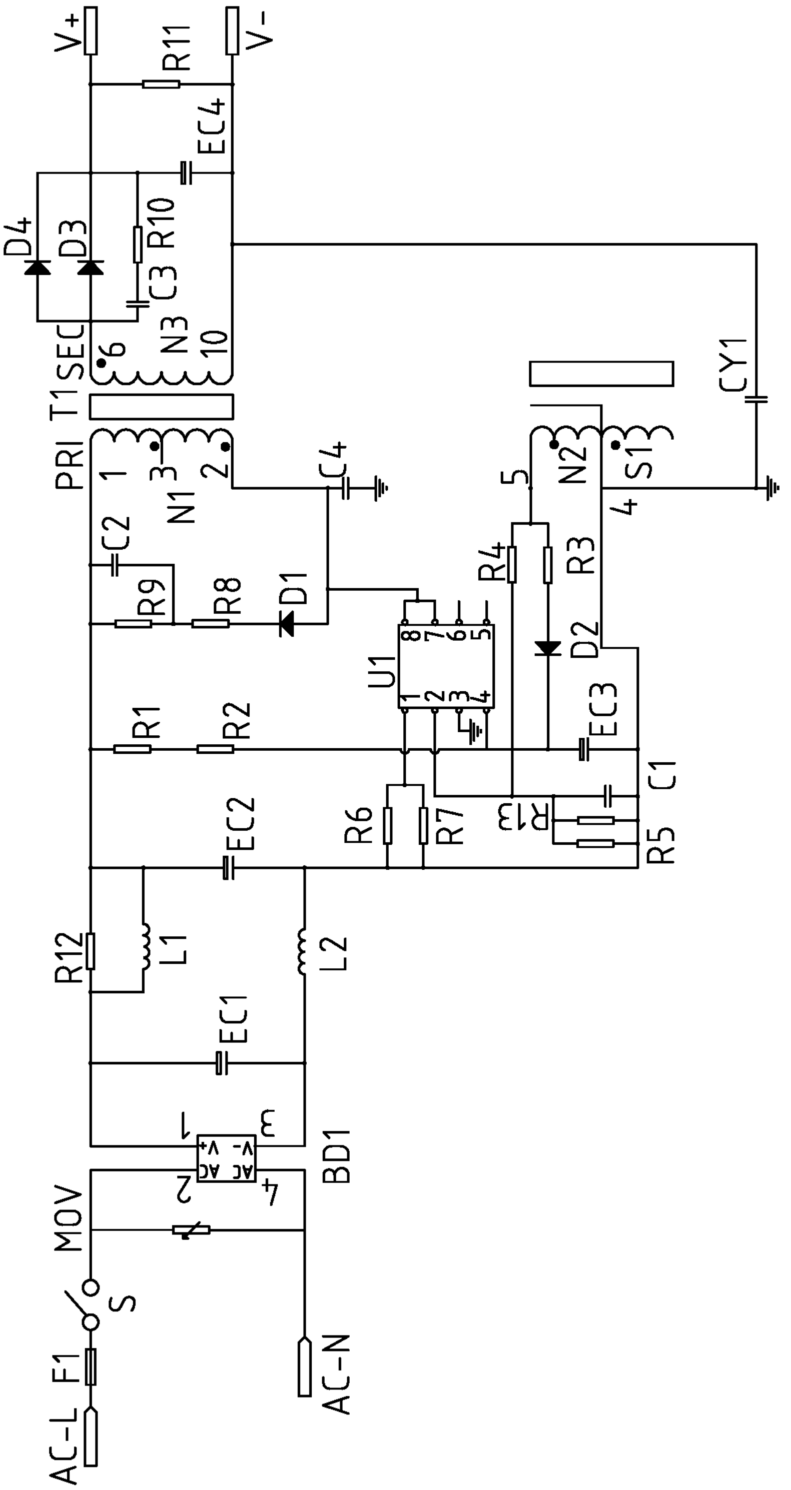
FIG. 6 is a circuit diagram of the first rectifier filter device with a thermal coupler switch.

As shown in FIGS. 4 and 6, the circuit board comprises a power input, the first rectifier filter device, transformer T1, feedback circuit, power chip, second rectifier filter device, switching component, and power output. The first rectifier filter device comprises a fuse and a thermal coupler switch. When the temperature is too high, the thermal coupler switch will also automatically disconnect, preventing excessive current from affecting the circuit's components, thus avoiding damage due to overload caused by high temperatures. The power signal sequentially passes through the first rectifier filter device, switching component, transformer T1, and the second rectifier filter device, with the power signal also transmitted to the switching component through the feedback circuit and power chip after passing through transformer T1.

As shown in FIGS. 4 and 6, the first rectifier filter device also comprises bridge rectifier BD1, resistor R12, inductor L1, capacitor EC2, and inductor L2; the feedback circuit comprises resistor R5, resistor R13, capacitor C1, capacitor EC3, transformer T1, capacitor CY1, diode D2, resistor R3, and resistor R4; the switching component comprises capacitor C4, diode D1, resistor R8, resistor R9, and capacitor C2; the second rectifier filter device comprises D3, D4, capacitor C3, resistor R10, and capacitor EC4. The live wire of the power input sequentially connects through fuse F1, thermal coupler switch, to the second pin of bridge rectifier BD1; the fourth pin of BD1 connects to the neutral line of the power input; the first pin of BD1 connects to the input end of a parallel circuit formed by resistor R12 and inductor L1, the output of this parallel circuit connects to the primary coil of transformer T1 at one end, and sequentially through R1 and R2 to the fourth pin of the power chip, the output end of the parallel circuit connects to the positive pole of capacitor EC2, whose negative pole connects to the output end of inductor L2. The third pin of BD1 connects to the input end of inductor L2, whose output end through a circuit formed in parallel by R6 and R7 connects to the first pin of the power chip; the output end of inductor L2 through a circuit formed in parallel by R5, R13, and capacitor C1 connects to the second pin of the power chip; inductor L2 connects to the negative pole of capacitor EC3. The seventh and eighth pins of power chip U1, after being paralleled, sequentially pass through diode D1, resistor R8, whose output end through a parallel circuit formed by resistor R9 and capacitor C2 connects to one end of the primary coil of transformer T1; the seventh and eighth pins of the power chip, after being paralleled, connect to the second terminal of the primary coil of T1. The sixth terminal of the secondary coil of T1 through a parallel circuit formed by diode D4, diode D3, and capacitor C3 connects to the positive terminal of the power output, capacitor C3 and resistor R10 are connected in series, the tenth terminal of T1 connects to the negative terminal of the power output; the tenth terminal of T1 connects to capacitor CY1, whose output terminal grounds, connects to the output end of inductor L2, and to the fourth terminal of T1. The fifth terminal of T1 sequentially through resistor R3, diode D2 connects to the positive terminal of capacitor EC3, and through resistor R4 connects to the positive terminal of EC3, whose positive terminal connects to the fourth pin of the power chip.

Example 3

As shown in FIGS. 1 to 3, the waterproof structure of this patent application's transformer plug comprises a plug body 1 with a hollow housing part 2 inside, which houses a circuit board 3. One end of the plug body 1 is equipped with two power conductors 4 connected to this circuit board 3, while the other end is sealed with a back cover 5 enclosing the housing part 2. The back cover 5 has a socket hole 62, and around this socket hole within the back cover, there's a connected flange 7 forming a cavity 8, with three stiffeners 9 located between the flange 7 and the back cover's inner sidewall, positioned on the sides and top of the flange. The cavity's 8 inner wall features barbs 71. During wire installation, the wire is first threaded through the socket hole 62 on the back cover 5 and electrically connected to the circuit board 3, then the cavity 8 is filled with glue. Once the glue in the cavity 8 solidifies, it effectively seals the socket hole 62, enhancing waterproofing. The stiffeners 9 strengthen the flange's 7 structure, making the waterproof structure of the socket hole 62 more reliable. The barbs 71 hook onto the cured sealant, improving the bond between the sealant and the flange 7, thus enhancing the waterproof structure's reliability. The back cover 5 features a connecting hole 6 with chamfers 61 on its inner wall surface to prevent misalignment when connecting to a light string. The outer surface of the connecting hole 6 has threads for connecting to the light string.

Figure 7:
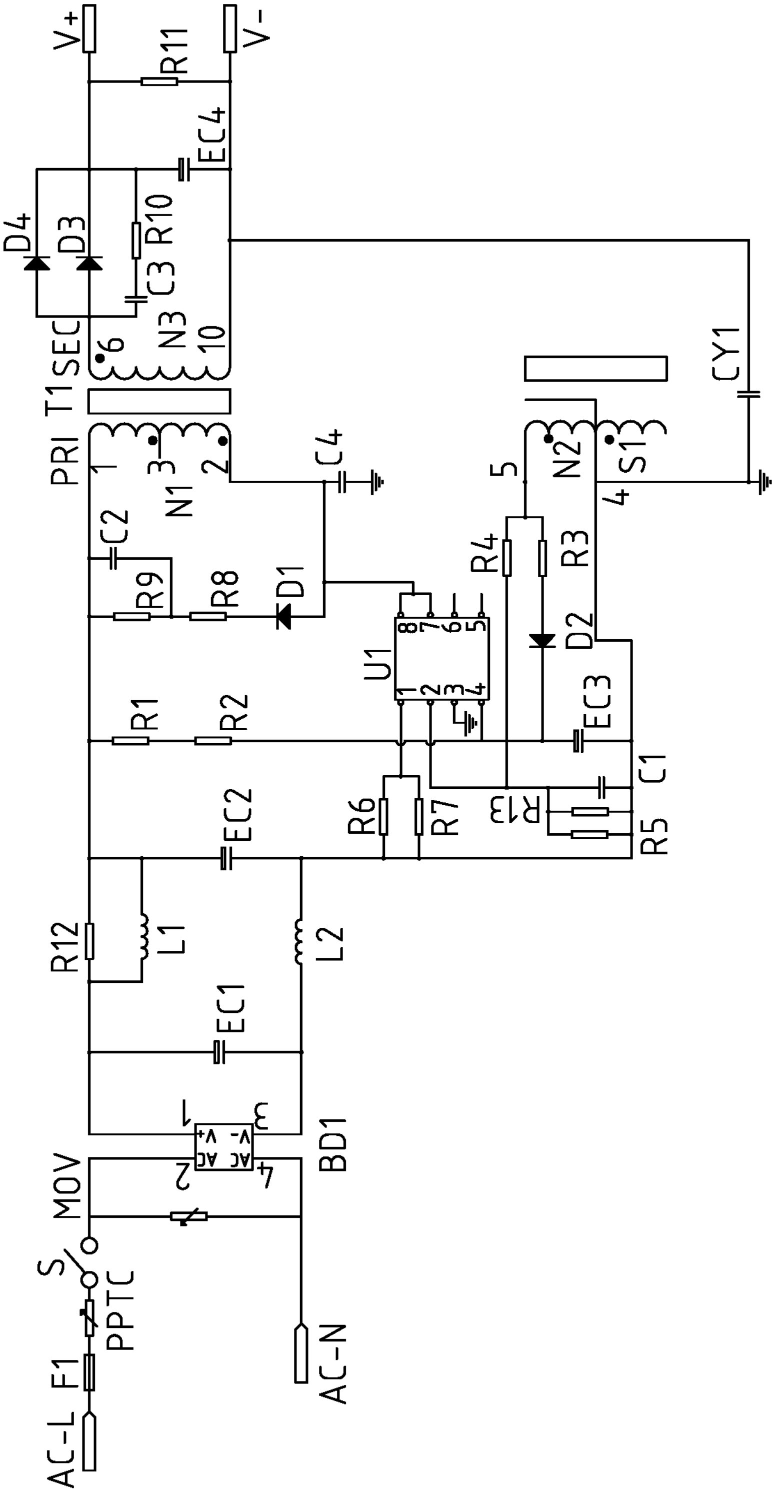
FIG. 7 is a circuit diagram of the first rectifier filter device with both a PTC and a thermal coupler switch.

As shown in FIGS. 4 and 7, the circuit board comprises a power input, the first rectifier filter device, transformer T1, feedback circuit, power chip, second rectifier filter device, switching component, and power output. The first rectifier filter device comprises a fuse, PTC, and thermal coupler switch. When the temperature is too high, the PTC increases its resistance with temperature, and the thermal coupler switch automatically disconnects, preventing excessive current from affecting the circuit's components, thus avoiding damage due to overload caused by high temperatures. The power signal sequentially passes through the first rectifier filter device, switching component, transformer T1, and the second rectifier filter device, with the power signal also transmitted to the switching component through the feedback circuit and power chip after passing through transformer T1.

As depicted in FIGS. 4 and 7, the first rectifier filter device also comprises bridge rectifier BD1, resistor R12, inductor L1, capacitor EC2, and inductor L2; the feedback circuit comprises resistor R5, resistor R13, capacitor C1, capacitor EC3, transformer T1, capacitor CY1, diode D2, resistor R3, and resistor R4; the switching component comprises capacitor C4, diode D1, resistor R8, resistor R9, and capacitor C2; the second rectifier filter device consists of D3, D4, capacitor C3, resistor R10, and capacitor EC4. The live wire of the power input sequentially connects through fuse F1, PTC, thermal coupler switch, to the second pin of bridge rectifier BD1; the fourth pin of BD1 connects to the neutral line of the power input; the first pin of BD1 connects to the input end of a parallel circuit formed by resistor R12 and inductor L1, the output of this parallel circuit connects to the primary coil of transformer T1 at one end, and sequentially through R1 and R2 to the fourth pin of the power chip, the output end of the parallel circuit connects to the positive pole of capacitor EC2, whose negative pole connects to the output end of inductor L2. The third pin of BD1 connects to the input end of inductor L2, whose output end through a circuit formed in parallel by R6 and R7 connects to the first pin of the power chip; the output end of inductor L2 through a circuit formed in parallel by R5, R13, and capacitor C1 connects to the second pin of the power chip; inductor L2 connects to the negative pole of capacitor EC3. The seventh and eighth pins of power chip U1, after being paralleled, sequentially pass through diode D1, resistor R8, whose output end through a parallel circuit formed by resistor R9 and capacitor C2 connects to one end of the primary coil of transformer T1; the seventh and eighth pins of the power chip, after being paralleled, connect to the second terminal of the primary coil of T1. The sixth terminal of the secondary coil of T1 through a parallel circuit formed by diode D4, diode D3, and capacitor C3 connects to the positive terminal of the power output, capacitor C3 and resistor R10 are connected in series, the tenth terminal of T1 connects to the negative terminal of the power output; the tenth terminal of T1 connects to capacitor CY1, whose output terminal grounds, connects to the output end of inductor L2, and to the fourth terminal of T1. The fifth terminal of T1 sequentially through resistor R3, diode D2 connects to the positive terminal of capacitor EC3, and through resistor R4 connects to the positive terminal of EC3, whose positive terminal connects to the fourth pin of the power chip.

The invention claimed is:

1. A festival light device with temperature control protection, comprising a plug body, a back cover set on the plug body, and a circuit board located inside the plug body;

the back cover features a connecting hole, within which a socket hole is set, wherein:

on the inner surface of the back cover, there is a flange, which together with the back cover's inner surface forms a cavity, with the socket hole located within the cavity formed by the flange;

the circuit board is equipped with a power input, a first rectifier filter device, a transformer (T1), a feedback circuit, a power chip (U1), a second rectifier filter device, a switching component, and a power output, with the first rectifier filter device comprising a fuse (F1) and a positive temperature coefficient (PTC) thermistor;

a power signal from the power input sequentially passes through the first rectifier filter device, the switching component, the transformer (T1), and the second rectifier filter device, and after passing through the transformer (T1), the power signal is further transmitted to the switching component via a feedback loop through the feedback circuit and the power chip (U1);

the first rectifier filter device also comprises a bridge stack (BD1), a resistor (R12), an inductor (L1), a capacitor (EC2), and an inductor (L2); the feedback circuit comprises a resistor (R5), a resistor (R13), a capacitor (C1), a capacitor (EC3), a diode (D2), a resistor (R3), and a resistor (R4); the second rectifier filter device comprises a diode (D3), a diode (D4), a capacitor (C3), a resistor (R10), and a capacitor (EC4); the switching component is located on the power chip (U1);

the live wire of the power input is sequentially connected through the fuse (F1), the positive temperature coefficient (PTC) thermistor, to the second pin of the bridge stack (BD1); the fourth pin of the bridge stack (BD1) is connected to the neutral line of the power input;

the first pin of the bridge stack (BD1) is connected to the negative pole of the capacitor (EC1);

the first pin of the bridge stack (BD1) is further connected to the input end of a parallel circuit formed by the resistor (R12) and the inductor (L1), the output end of the parallel circuit is connected to the first terminal of the primary coil of the transformer (T1), the output end of the parallel circuit is sequentially connected to the fourth pin of the power chip (U1) through the resistor (R1) and the resistor (R2), the output end of the parallel circuit is connected to the positive pole of the capacitor (EC2), and the negative pole of the capacitor (EC2) is connected to the output end of the inductor (L2);

the third pin of the bridge stack (BD1) is connected to the positive pole of the capacitor (EC1);

the third pin of the bridge stack (BD1) is further connected to the input end of the inductor (L2), and the output end of the inductor (L2) is connected to the first pin of the power chip (U1) through a circuit formed by a resistor (R6) and a resistor (R7) connected in parallel;

the output end of the inductor (L2) is connected to the second pin of the power chip (U1) through a circuit formed in parallel by the resistor (R5), the resistor (R13), and the capacitor (C1); the inductor (L2) is connected to the negative pole of the capacitor (EC3);

the seventh pin and the eighth pin of the power chip (U1) are connected in parallel, the parallel-connected seventh and eighth pins are sequentially connected to a diode (D1) and a resistor (R8), and the output end of the resistor (R8) is connected to the first terminal of the primary coil of the transformer (T1) through a parallel circuit formed by a resistor (R9) and a capacitor (C2);

the seventh pin and the eighth pin of the power chip (U1), after being connected in parallel, are connected to the second terminal of a primary coil of the transformer (T1);

the sixth terminal of the secondary coil of the transformer (T1) is connected to the positive pole of the power output through a parallel circuit formed by the diode (D4), the diode (D3), and the capacitor (C3), the capacitor (C3) and the resistor (R10) are connected in series, the tenth terminal of the transformer (T1) is connected to the negative pole of the power output;

the tenth terminal of the transformer (T1) is connected to the capacitor (CY1), and the output terminal of the capacitor (CY1) is connected to ground, the output end of the inductor (L2), and the fourth terminal of the transformer (T1);

the fifth terminal of the transformer (T1) is sequentially connected to the positive pole of the capacitor (EC3) through the resistor (R3) and the diode (D2), the fifth terminal of the transformer (T1) is connected to the positive pole of the capacitor (EC3) through the resistor (R4), and the positive pole of the capacitor (EC3) is connected to the fourth pin of the power chip (U1).

2. The festival light device with temperature control protection according to claim 1, wherein: the outer sidewall of the flange is equipped with three stiffeners connected to the inner sidewall of the back cover, placed respectively on the sides and top of the flange; barbs are set on the inner sidewall of the flange; the inner wall surface of the connecting hole is equipped with chamfers, and the outer surface of the connecting hole has threads for connecting to a light string.

3. A festival light device with temperature control protection, comprising a plug body, a back cover set on the plug body, and a circuit board located inside the plug body;

the back cover features a connecting hole, within which a socket hole is set, wherein:

on the inner surface of the back cover, there is a flange, which together with the back cover's inner surface forms a cavity, with the socket hole located within the cavity formed by the flange;

the circuit board comprises a power input, a first rectifier filter device, a transformer (T1), a feedback circuit, a power chip (U1), a second rectifier filter device, a switching component, and a power output, with the first rectifier filter device comprising a fuse (F1) and a thermal coupler switch;

a power signal from the power input sequentially passes through the first rectifier filter device, the switching component, the transformer (T1), and the second rectifier filter device, and after passing through the transformer (T1), the power signal is further transmitted to the switching component via a feedback loop through the feedback circuit and the power chip (U1);

the first rectifier filter device also comprises a bridge stack (BD1), a resistor (R12), an inductor (L1), a capacitor (EC2), and an inductor (L2); the feedback circuit comprises a resistor (R5), a resistor (R13), a capacitor (C1), a capacitor (EC3), a diode (D2), a resistor (R3), and a resistor (R4); the second rectifier filter device comprises a diode (D3), a diode (D4), a capacitor (C3), a resistor (R10), and a capacitor (EC4); the switching component is located on the power chip (U1);

the live wire of the power input is sequentially connected through the fuse (F1), the thermal coupler switch, to the second pin of the bridge stack (BD1); the fourth pin of the bridge stack (BD1) is connected to the neutral line of the power input;

the first pin of the bridge stack (BD1) is connected to the negative pole of the capacitor (EC1);

the first pin of the bridge stack (BD1) is further connected to the input end of a parallel circuit formed by the resistor (R12) and the inductor (L1), the output end of the parallel circuit is connected to the first terminal of the primary coil of the transformer (T1), the output end of the parallel circuit is sequentially connected to the fourth pin of the power chip (U1) through the resistor (R1) and the resistor (R2), the output end of the parallel circuit is connected to the positive pole of the capacitor (EC2), and the negative pole of the capacitor (EC2) is connected to the output end of the inductor (L2);

the third pin of the bridge stack (BD1) is connected to the positive pole of the capacitor (EC1);

the third pin of the bridge stack (BD1) is further connected to the input end of the inductor (L2), and the output end of the inductor (L2) is connected to the first pin of the power chip (U1) through a circuit formed by a resistor (R6) and a resistor (R7) connected in parallel; the output end of the inductor (L2) is connected to the second pin of the power chip (U1) through a circuit formed in parallel by the resistor (R5), the resistor (R13), and the capacitor (C1); the inductor (L2) is connected to the negative pole of the capacitor (EC3);

the seventh pin and the eighth pin of the power chip (U1) are connected in parallel, the parallel-connected seventh and eighth pins are sequentially connected to a diode (D1) and a resistor (R8), and the output end of the resistor (R8) is connected to the first terminal of the primary coil of the transformer (T1) through a parallel circuit formed by a resistor (R9) and a capacitor (C2);

the seventh pin and the eighth pin of the power chip (U1), after being connected in parallel, are connected to the second terminal of a primary coil of the transformer (T1);

the sixth terminal of the secondary coil of the transformer (T1) is connected to the positive pole of the power output through a parallel circuit formed by the diode (D4), the diode (D3), and the capacitor (C3), the capacitor (C3) and the resistor (R10) are connected in series, the tenth terminal of the transformer (T1) is connected to the negative pole of the power output;

the tenth terminal of the transformer (T1) is connected to the capacitor (CY1), and the output terminal of the capacitor (CY1) is connected to ground, the output end of the inductor (L2), and the fourth terminal of the transformer (T1);

the fifth terminal of the transformer (T1) is sequentially connected to the positive pole of the capacitor (EC3) through the resistor (R3) and the diode (D2), the fifth terminal of the transformer (T1) is connected to the positive pole of the capacitor (EC3) through the resistor (R4), and the positive pole of the capacitor (EC3) is connected to the fourth pin of the power chip (U1).

4. The festival light device with temperature control protection according to claim 3, wherein: the outer sidewall of the flange is equipped with three stiffeners connected to the inner sidewall of the back cover, placed respectively on the sides and top of the flange; barbs are set on the inner sidewall of the flange; the inner wall surface of the connecting hole is equipped with chamfers, and the outer surface of the connecting hole has threads for connecting to a light string.

5. A festival light device with temperature control protection, comprising a plug body, a back cover set on the plug body, and a circuit board located inside the plug body;

the back cover features a connecting hole, within which a socket hole is set, wherein:

on the inner surface of the back cover, there is a flange, which together with the back cover's inner surface forms a cavity, with the socket hole located within the cavity formed by the flange;

the circuit board incorporates a power input, a first rectifier filter device, a transformer (T1), a feedback circuit, a power chip (U1), a second rectifier filter device, a switching component, and a power output;

the first rectifier filter device comprises a fuse (F1), a positive temperature coefficient (PTC) thermistor, and a thermal coupler switch;

a power signal from the power input passes sequentially through the first rectifier filter device, the switching component, the transformer T1, and the second rectifier filter device, and after passing through the transformer (T1), the power signal is further transmitted to the switching component via a feedback loop through the feedback circuit and power chip (U1);

the first rectifier filter device also comprises a bridge stack (BD1), a resistor (R12), an inductor (L1), a capacitor (EC2), and an inductor (L2); the feedback circuit comprises a resistor (R5), a resistor (R13), a capacitor (C1), a capacitor (EC3), a diode (D2), a resistor (R3), and a resistor (R4); the second rectifier filter device comprises a diode (D3), a diode (D4), a capacitor (C3), a resistor (R10), and a capacitor (EC4); the switching component is located on the power chip (U1);

the live wire of the power input is sequentially connected through the fuse (F1), the positive temperature coefficient (PTC) thermistor, and the thermal coupler switch to the second pin of the bridge stack (BD1); the fourth pin of the bridge stack (BD1) is connected to the neutral line of the power input;

the first pin of the bridge stack (BD1) is connected to the negative pole of the capacitor (EC1);

the first pin of the bridge stack (BD1) is further connected to the input end of a parallel circuit formed by the resistor (R12) and the inductor (L1), the output end of the parallel circuit is connected to the first terminal of the primary coil of the transformer (T1), the output end of the parallel circuit is sequentially connected to the fourth pin of the power chip (U1) through the resistor (R1) and the resistor (R2), the output end of the parallel circuit is connected to the positive pole of the capacitor (EC2), and the negative pole of the capacitor (EC2) is connected to the output end of the inductor (L2);

the third pin of the bridge stack (BD1) is connected to the positive pole of the capacitor (EC1);

the third pin of the bridge stack (BD1) is further connected to the input end of the inductor (L2), and the output end of the inductor (L2) is connected to the first pin of the power chip (U1) through a circuit formed by a resistor (R6) and a resistor (R7) connected in parallel;

the output end of the inductor (L2) is connected to the second pin of the power chip (U1) through a circuit formed in parallel by the resistor (R5), the resistor (R13), and the capacitor (C1); the inductor (L2) is connected to the negative pole of the capacitor (EC3);

the seventh pin and the eighth pin of the power chip (U1) are connected in parallel, the parallel-connected seventh and eighth pins are sequentially connected to a diode (D1) and a resistor (R8), and the output end of the resistor (R8) is connected to the first terminal of the primary coil of the transformer (T1) through a parallel circuit formed by a resistor (R9) and a capacitor (C2);

the seventh pin and the eighth pin of the power chip (U1), after being connected in parallel, are connected to the second terminal of a primary coil of the transformer (T1);

the sixth terminal of the secondary coil of the transformer (T1) is connected to the positive pole of the power output through a parallel circuit formed by the diode (D4), the diode (D3), and the capacitor (C3), the capacitor (C3) and the resistor (R10) are connected in series, the tenth terminal of the transformer (T1) is connected to the negative pole of the power output;

the tenth terminal of the transformer (T1) is connected to the capacitor (CY1), and the output terminal of the capacitor (CY1) is connected to ground, the output end of the inductor (L2), and the fourth terminal of the transformer (T1);

the fifth terminal of the transformer (T1) is sequentially connected to the positive pole of the capacitor (EC3) through the resistor (R3) and the diode (D2), the fifth terminal of the transformer (T1) is connected to the positive pole of the capacitor (EC3) through the resistor (R4), and the positive pole of the capacitor (EC3) is connected to the fourth pin of the power chip (U1).

6. The festival light device with temperature control protection according to claim 5, wherein: the outer sidewall of the flange features three stiffeners connected to the back cover's inner sidewall, placed respectively on the sides and top of the flange; barbs are set on the inner sidewall of the flange; the inner wall surface of the connecting hole has chamfers, and the outer surface of the connecting hole is threaded for connecting to a light string.

* * * * *